INVENTOR.
P. R. Towry

July 18, 1967 P. R. TOWRY 3,331,486
BOTTLE HANDLING APPARATUS
Filed April 27, 1966 6 Sheets-Sheet 4

INVENTOR.
P. R. Towry
BY
Attorneys

July 18, 1967 P. R. TOWRY 3,331,486
BOTTLE HANDLING APPARATUS
Filed April 27, 1966 6 Sheets-Sheet 5

INVENTOR.
P. R. Towry
BY
Attorneys

INVENTOR.
P. R. Towry
BY
Attorneys

United States Patent Office 3,331,486
Patented July 18, 1967

3,331,486
BOTTLE HANDLING APPARATUS
P. R. Towry, Saratoga, Calif., assignor to Di Giorgio Corporation, San Francisco, Calif., a corporation of Delaware
Filed Apr. 27, 1966, Ser. No. 545,586
5 Claims. (Cl. 198—33)

This invention relates to apparatus for handling bottles of a type which are fillable from one end and wherein the bottles are adapted to be positioned upright and carried in a line by a conveyor for filling. The apparatus disclosed herein is particularly useful in handling very light-weight plastic bottles.

Light-weight plastic bottles, for example, having on the order of 15 grams weight, have insufficient weight to impart anything more than minimal stability. Such bottles, therefore, are quite easily upset and, in the past, have been difficult to handle.

It is a general object of the invention to provide an improved bottle handling apparatus particularly useful in handling light-weight plastic bottles.

It is another object of the invention to provide a bottle handling system wherein light-weight plastic bottles can be received in a bulk accumulation thereof and transformed into a line of bottles oriented upright for filling.

Another object of the invention is to provide a system of the kind described capable of operating at high speeds notwithstanding those characteristics of light-weight plastic bottles inimical to rapid handling thereof, such as their tendency to bounce and an inherent lack of stability which would otherwise be imparted by significant weight.

These and other objects of the invention will be more clearly apparent from the following detailed description of a preferred embodiment of the invention when considered in conjunction with the attached drawings in which.

Figure 1:
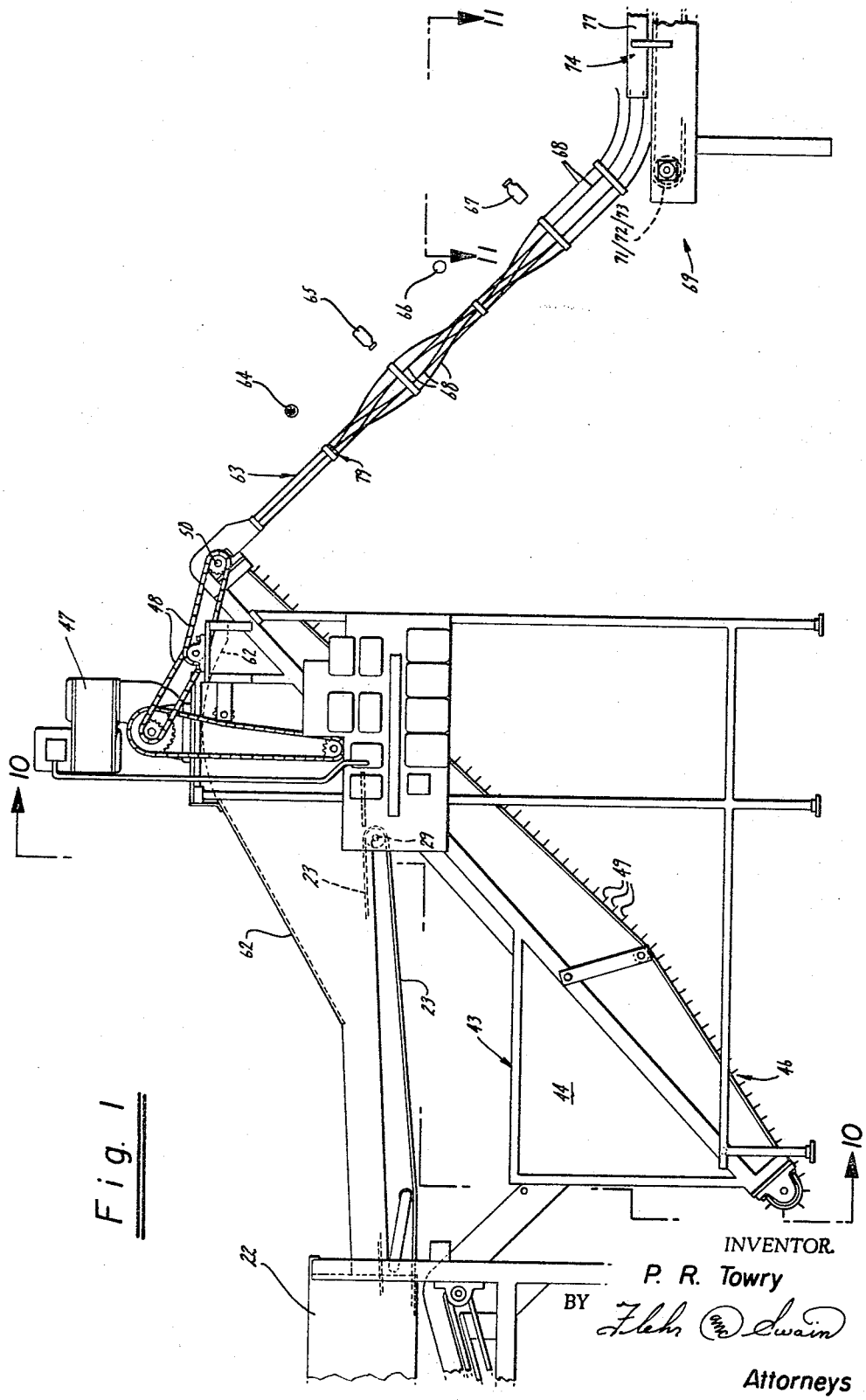
FIGURE 1 is a side elevation view showing a system according to the invention.

In general, a system has been provided for handling bottles of a type which are fillable from one end and wherein the bottles are adapted to be positioned upright and carried in a line by a conveyor for filling.

The system, in general, comprises bin means adapted to receive randomly arranged bottles in a bulk accumulation thereof. Means for withdrawing bottles from the bulk accumulation and for feeding them on their sides in a direction normal to their axes serves to form streams of bottles wherein the bottles are oriented to point in either of two opposite directions as they move in a direction normal to their axes. On the average, around half of the bottles will be pointing in the "wrong" direction whereby they would be later positioned upside down on the conveyor for filling if permitted to remain. Accordingly, means for removing from the stream of bottles all of those bottles oriented to point in a given direction serves to remove essentially half of the bottles moving in each stream.

The remaining bottles are fed to a guide arrangement for turning them to an upstanding position for discharge onto the delivery conveyor for filling. Finally, throughout the length of the stream, axial movement of the bottles is confined to a degree precluding end-for-end turning of the bottles so as to maintain each and every bottle under close control whereby they may be handled more rapidly.

Further, in general, as the stream of bottles is discharged onto a conveyor to carry the bottles in a line for filling, means have provided defining a resistance zone in the path of the bottles serving to cause crowding of the bottles while oriented in an upright position. Bottles are discharged from each of several guide channels in an upright position into the resistance zone of the conveyor at a rate in excess of the capability of the conveyor to remove bottles from the zone. The bottles in the zone are thereby maintained under the pressure of a portion of the several streams of arriving bottles, which pressure is sufficient to preclude rearward tumbling of bottles in the resistance zone.

Having in mind the foregoing, the system comprises a bin assembly 11 adapted to receive randomly arranged bottles in a bulk accumulation thereof. Bin assembly 11 further includes means serving to withdraw bottles from the accumulation of bottles in the bin and to feed the withdrawn bottles, on their sides, in a direction normal to their axes so as to initiate several streams of bottles wherein the bottles are oriented to point in either of two opposite directions and moving in a direction normal thereto.

The overall system includes means forming several streams of bottles. However, for simplicity of explanation, only one stream will be described, as it is to be understood that each stream is formed in the same manner.

Thus, bin assembly 11 includes a hopper 12 defined by front and back inclined walls 12, 14 and including a discharge opening 16 at the bottom thereof. Hopper 12 is subdivided laterally by sloping divider members 17, 18 and 19 serving to break up hopper 12 into four loading zones 21a–21d.

Bin assembly 11 includes a main storage portion forming merely a large receptacle 22 for receiving bottles dumped therein to be passed into hopper 12. Hopper 12 is also supplied with bottles from a conveyor belt 23 which returns certain bottles to hopper 12 which have been removed from the stream of bottles further upstream. Thus, belt 23 is trained about a pair of rollers 28, 29 whereby a drive motor 24 and belt and pulley 26, 27 cyclically operate conveyor belt 23.

Each of loading zones 21 delivers bottles to a conveyor arrangement which serves to carry the bottles in a path normal to their axes and confined axially to a degree precluding end-for-end turning of the bottles. In this manner, the bottles are formed into streams of bottles moving through the system.

Accordingly, beneath hopper 12 and receptacle 22, there lies a cyclic moving carrier assembly 31 composed of a series of parallel rods 32 secured at their ends in a pair of belts or chains 33 whereby rods 32 move in fixed relation spaced along an inclined plane beneath hopper 12.

Rods 32 include enlarged cylindrical portions 34 disposed to travel upwardly in converging channels 36a–36d defined by spaced dividers 37 in the form of upstanding walls. It will be observed that each channel 36 becomes narrower as carrier 31 moves upwardly along its inclined plane. The spacing between dividers 37 at their lower ends is adapted to be moderately greater than the axial extent of bottles to be fed through the system. Thus, the bottles have more clearance to fall into channels 36 at the lower ends thereof. The bottles, however, are jostled by carrier assembly 31 as they are discharged from hopper 12 and, accordingly, bottles fall into channels 36 readily and become confined in their axial movement rather severely by the time they reach the upper end of carrier 31.

The degree to which the axial movement of bottles in channels 36 is restricted is at least that which is sufficient to preclude end-for-end turning of the bottles. Once the bottles are so confined, they are maintained under similar confinement throughout their movement through the entire system.

Figure 2:
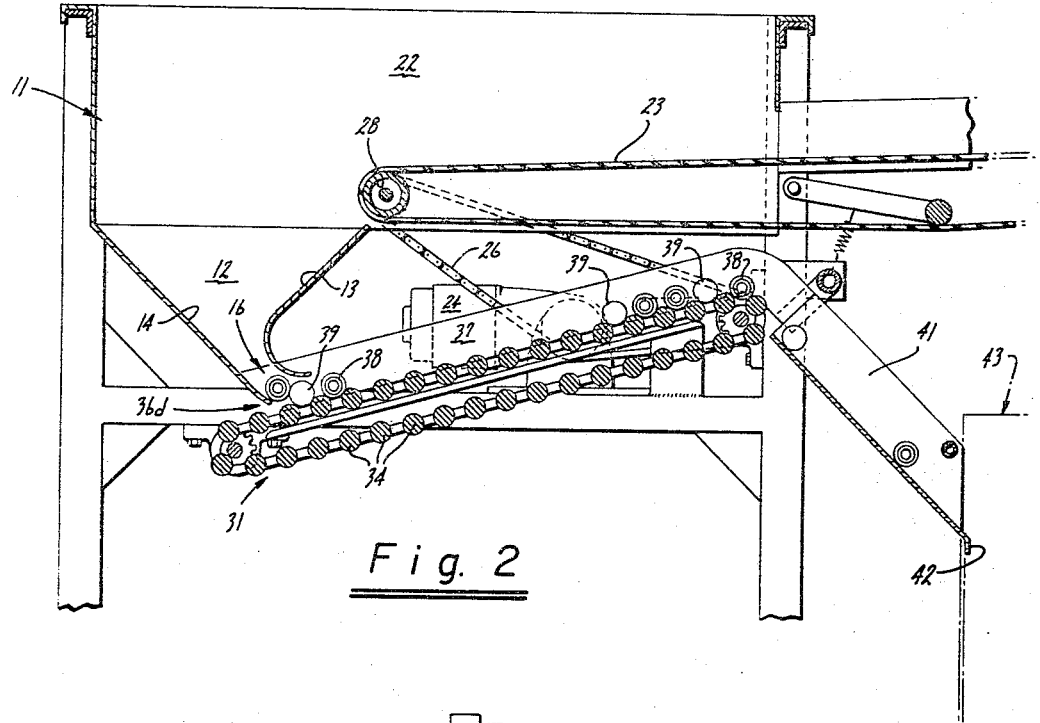
FIGURES 2 and 3 are respectively side elevation and top plan views of a bin construction wherein a bulk accumulation of bottles is formed into four streams thereof.
Figure 3:
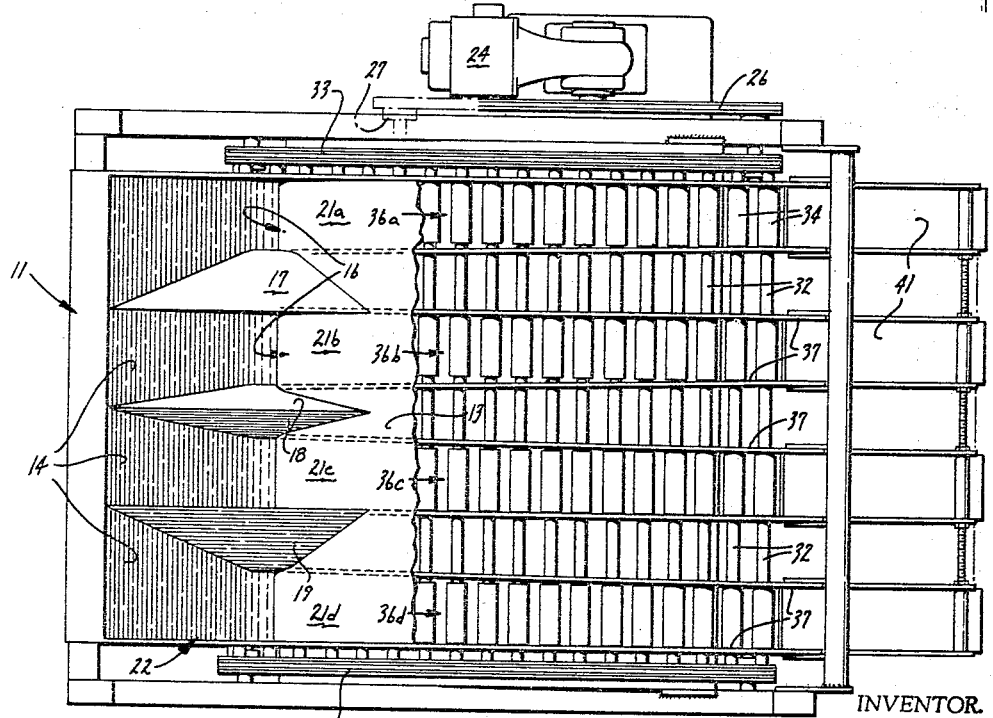

From the construction shown in FIGURES 2 and 3, it will be readily apparent that bottles will be oriented to point in each of two opposite directions. Thus, bottles 38 are oriented whereby, as viewed in FIGURE 2, the bottle is seen from its filling end and bottles 39 are oriented so that they are viewed, in FIGURE 2, from the bottom.

Figure 6:
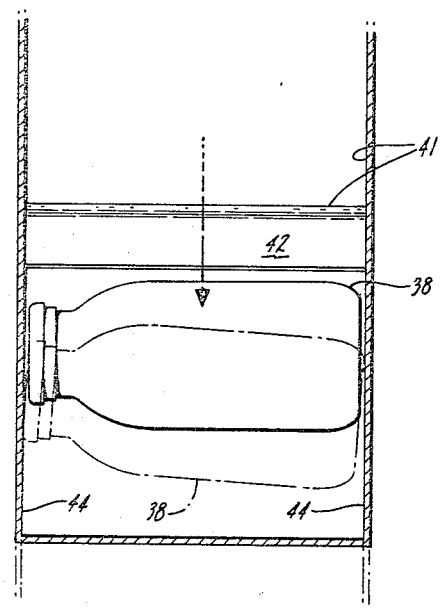
FIGURE 6 is an enlarged detailed view taken along the line 6—6 of FIGURE 4.

As cyclic carrier 31 is driven by motor 24, bottles 38, 39 are carried upwardly to be discharged therefrom via chutes 41 which continue to confine the axial movement of each bottle therein. The lip 42 of each chute 41 enters an associated feed hopper 43. The side walls of each feed hopper 43 are spaced to correspond substantially to the axial extent of bottles being handled with only slight clearance. Thus, referring to FIGURE 6, there is shown a bottle 38 as it moves between the side walls 44 of feed hopper 43. In phantom lines, bottle 38 is shown in a canted position whereby it is evident that the bottle is precluded from turning end-for-end.

An elevator style conveyor, including laterally extending lifting flites moving through the accumulated bottles in feed hopper 43, serves to carry bottles out of each feed hopper 43.

Thus, a cyclic driven conveyor belt assembly 46, inclined at a substantial angle to the horizontal, is driven from its upper end by means of a motor 47 and drive chains 48 trained about pulleys as shown. Lifting flites 49 are spaced longitudinally along belt 46 to accommodate a single bottle therebetween. Each belt assembly 46 is controlled by its own clutch (not shown) which serves to provide a controllable power take-off from the continuously running axle 50.

Figure 7:
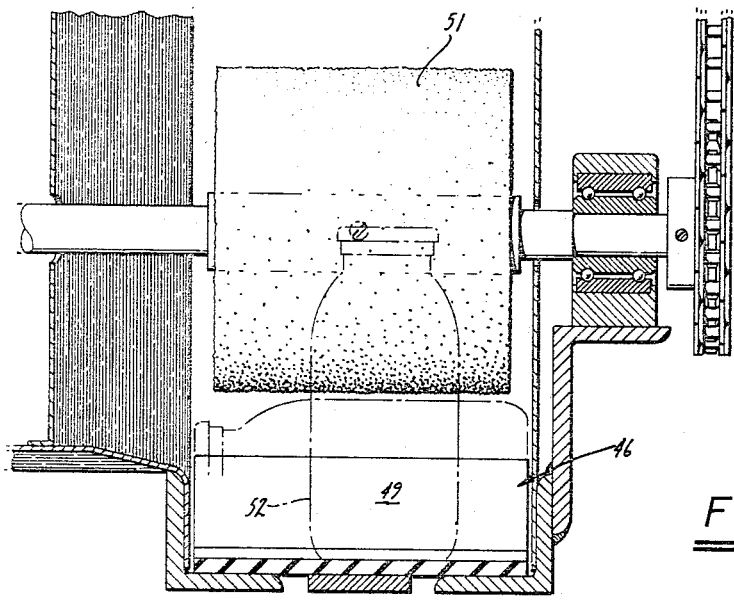
FIGURE 7 is an enlarged detailed view taken along the line 7—7 of FIGURE 5.

At some stage in the moving stream of bottles, all bottles in the stream become oriented to lie in a predetermined direction. Accordingly, as now to be described, means for removing improperly seated bottles as well as all of those bottles pointing the "wrong" way comprises a power-driven rotating brush 51 powered from motor 47. Brush 51 is disposed upon an axis in spaced parallel relation to the axes of bottles lying properly in the stream of bottles moving upwardly along conveyor belt 46 (FIGURE 7). Thus, only if a bottle were to be found in a standing position or improperly seated between flites 49, would brush 51 contact the bottle. However, upon contact with brush 51, that particular bottle will be ejected rearwardly onto conveyor belt 23 and returned to hopper 12.

Inasmuch as the side walls 44 of feed hopper 43 essentially preclude end-for-end turning of a bottle deposited therein, the presence of a bottle, such as bottle 52, in a dislodged position will be extremely rare. However, were such a bottle to be carried further upwardly above the location of brush 51, it could create such serious difficulties by way of jamming and impairing the proper functioning of the apparatus, that brush 51 has been provided to guard against such an eventuality.

Figure 8:
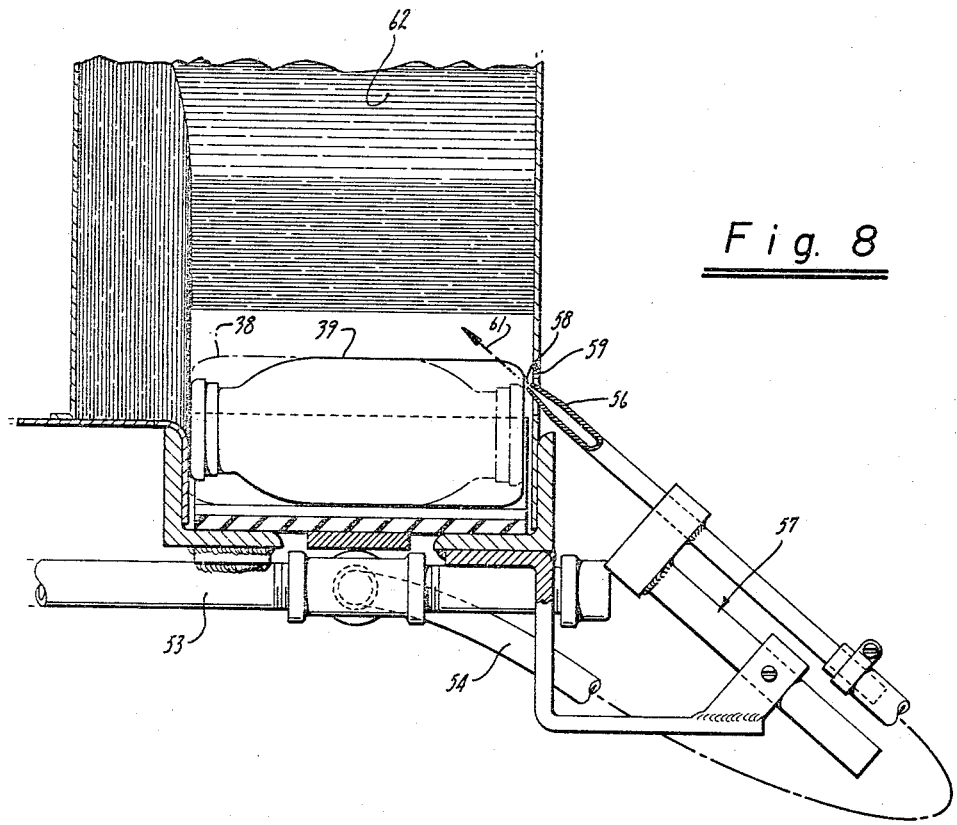
FIGURE 8 is an enlarged detailed view showing an air jet ejection means and taken along the line 8—8 of FIGURE 5.

Means for removing all of those bottles pointing the "wrong" way in conveyor 46 intercepts the bottles at a point in their travel prior to their discharge from conveyor 46. Thus, means serving to direct a jet of air to impinge upon the bottoms of bottles 39 pointed in the "wrong" direction serves to remove them from conveyor 46. With particular reference to FIGURE 8, there is shown a bottle 39 in full lines and, in phantom lines, a bottle 38. A manifold 53 supplies air from a suitable source (not shown) via a tubing 54 to a nozzle 56. Nozzle 56 is carried in a slidable mounting assembly 57 whereby the tip 58 can be positioned in an opening 59 formed through the side wall of each conveyor assembly 46 so as to direct a jet of air in the direction of arrow 61.

Figure 5:
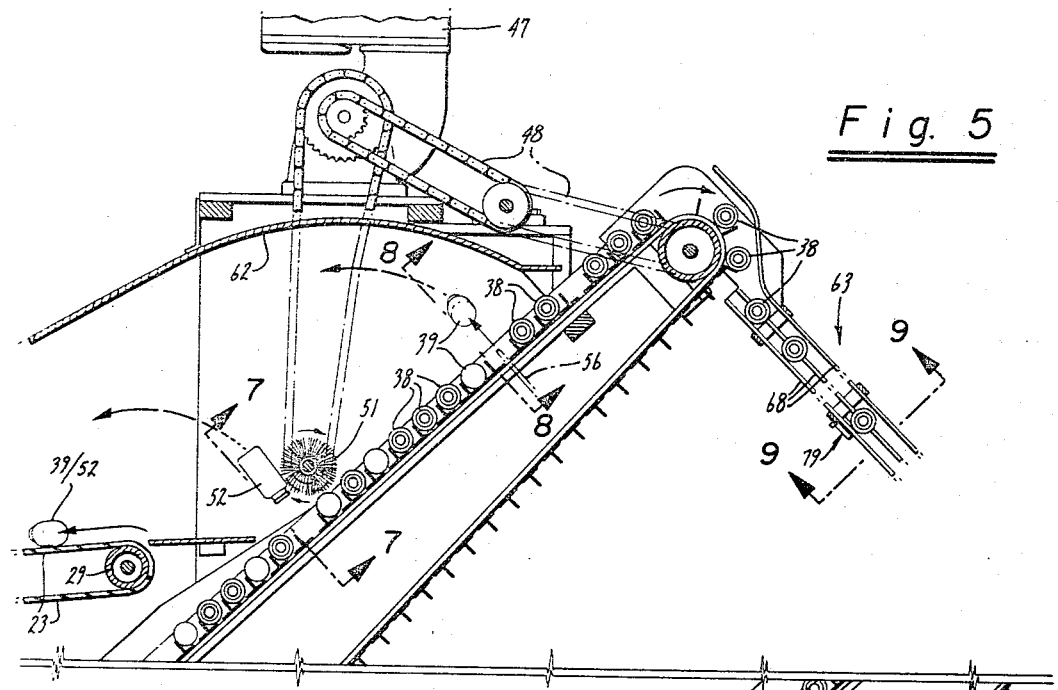
FIGURES 4 and 5 are side elevation section views showing the lower and upper portions of an elevator conveyor apparatus for receiving and discharging bottles therefrom in the system shown in FIGURE 1.
Figure 4:
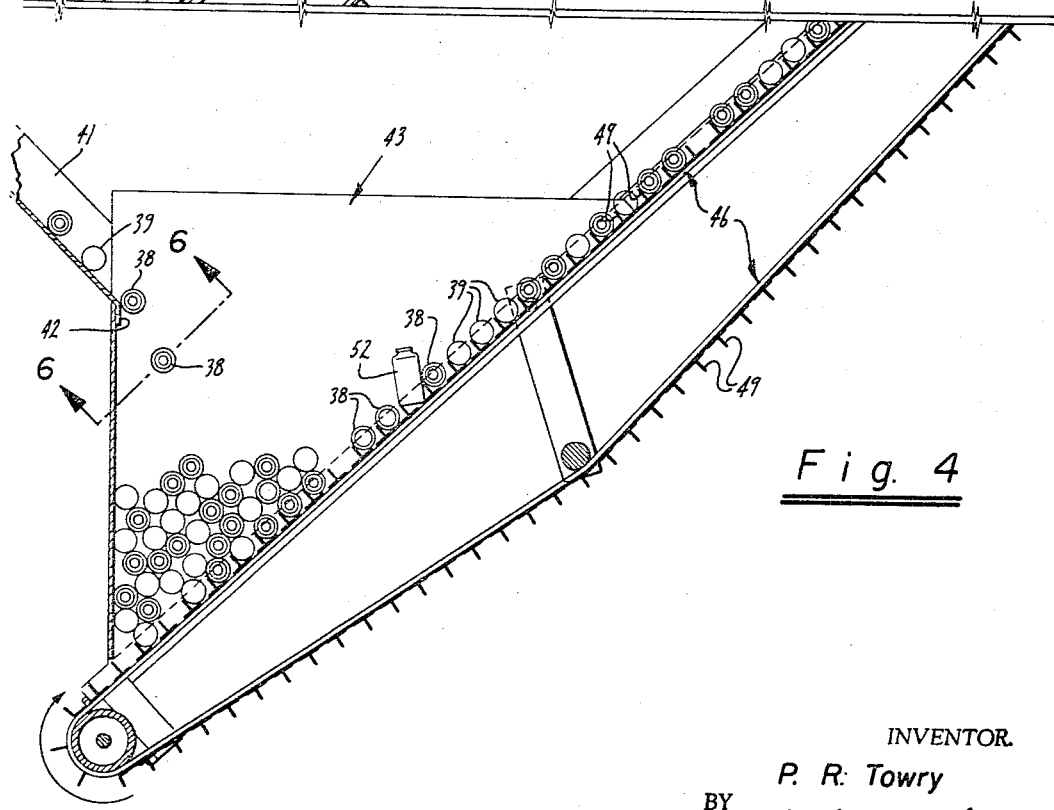

Bottles 38, 39 are on the order of 15 grams total weight. Thus, the slight contact that air stream 61 makes with the bottom of bottle 39 serves to raise it out of conveyor 46 as shown in FIGURE 5. As bottle 39 flies through the air, it will be deflected by a hood 62 whereby it ultimately lands upon conveyor 23 to be returned to feed hopper 12.

Those bottles 38 which are properly oriented in conveyor 46 avoid the thrust of jet 61 and, accordingly, pass upwardly with the cyclic movement of conveyor 46.

At the upper end of conveyor assembly 46, bottles 38 are carried into the upper end of means forming a guide channel which serves to rotate the axis of each bottle about the direction of bottle movement along its path. Thus, as shown in FIGURE 1, as each bottle 38 moves along a guide channel assembly 63, the bottle is variously oriented. At point 64, the bottle is oriented whereby it is viewed in FIGURE 1 looking into its filling end. At point 65, each bottle 38 will have been inverted. At point 66, the bottom of the bottle is viewed, and at point 67, the bottle has been turned upright, in which orientation it will remain throughout the remainder of its travel in guide channel assembly 63.

Figure 9:
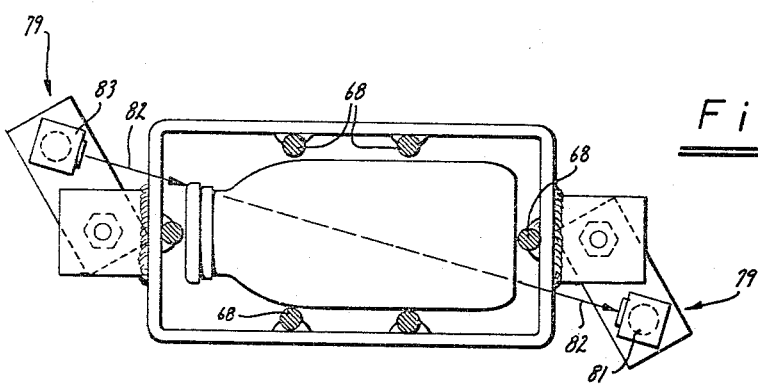
FIGURE 9 is an enlarged detailed view showing a photoelectric sensing arrangement taken along the line 9—9 of FIGURE 5.
Figure 11:
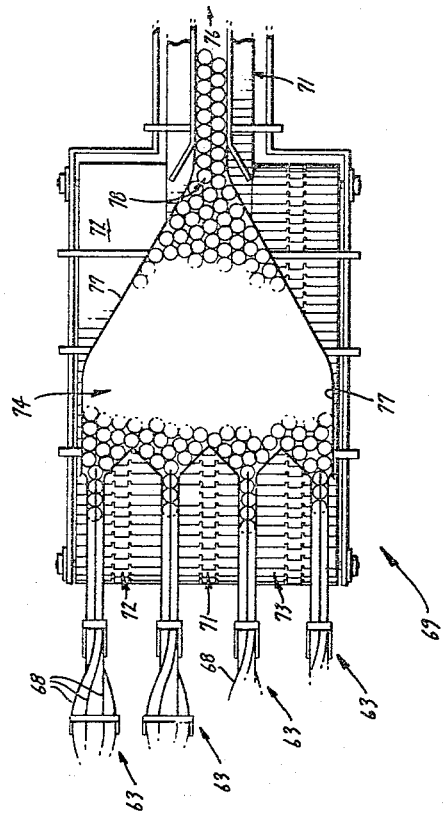
FIGURE 11 is a plan view taken along the lines 11—11 of FIGURE 1.
Figure 10:
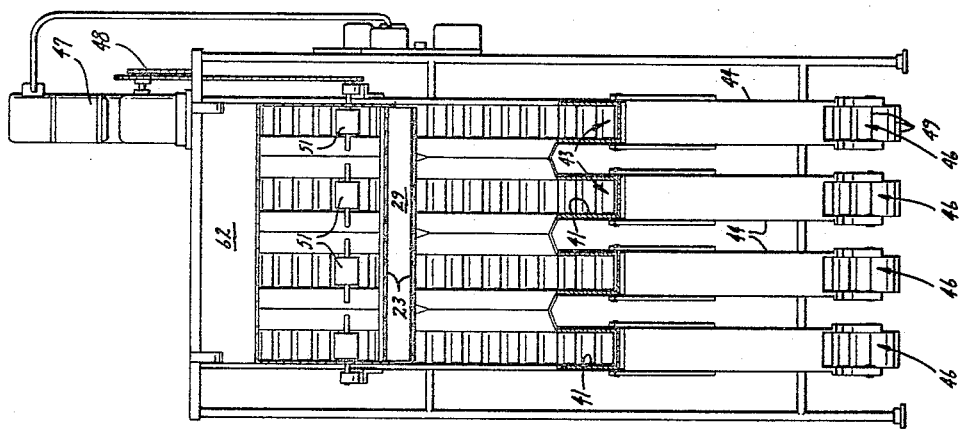
FIGURE 10 is a section view of FIGURE 1 taken along lines 10—10 thereof.

Guide channel assembly 63 is comprised of a number of spaced rods 68 shown best in FIGURES 1 and 9 to form a channel of substantially rectangular cross section.

Guide channel 63 twists about its longitudinal axis whereby the axis of each bottle 38 is rotated about the direction of bottle movement through an angle on the order of 270°. Thus, as shown in FIGURE 5, where bottles 38 are oriented with their axes lying substantially horizontally as they enter the upper end of guide channel 63, it will be readily apparent that each bottle is inverted, as at point 65 so that an air jet (not shown) can be directed into the interior of the bottle to remove any particles or fragments which might be found therein, as for example, as might remain as a result of manufacturing procedures.

The lower end of guide channel assembly 63 curves into the horizontal whereby bottles emerging from the end of channel assembly 63 will be travelling horizontally and in an upright position for discharge to a delivery conveyor assembly 69. Delivery assembly 69 serves to receive and carry bottles 38 upright for filling. Assembly 69 receives bottles 38 from each of the four guide channel assemblies 63 and merges the four streams into a single stream of bottles as now to be described.

Assembly 69 includes a main conveyor belt 71 and a pair of auxiliary conveyor belts 72, 73 at the sides of belt 71 to form a relatively broad delivery zone 74 for receiving bottles.

For purposes explained further below, means forming a resistance zone in the path of bottles being delivered onto conveyor assembly 69 serves to merge the four streams of bottles 38 into a single stream 76 thereof. Thus, a pair of baffles 77 forming upright walls converge to form a throat 78 and direct the four streams of bottles into stream 76. The aggregate number of bottles discharged from channels 63 provides quantities of bottles in zone 74 in excess of the capability of conveyor assembly 69 to transport them away thereby causing crowding in zone 74 among the discharged bottles. Hence, zone 74 becomes a resistance zone in the path of bottles 38.

The crowding of bottles in zone 74 is reflected back to bottles in each of channels 63 so as to retard movement of bottles arriving via guide channel assemblies 63.

It will be readily apparent that when handling extremely light-weight bottles of the kind described herein, any attempt to transport the bottles in an upright free-standing position becomes quite difficult in view of the minimal stability of the bottles and the ease with which they tip over. Accordingly, the foregoing crowding of the bottles in zone 74 advantageously serves to maintain lateral pressure on the upstanding bottles in the zone whereby the bottles are not given an opportunity to fall down. In short, by jamming the bottles into zone 74 and maintaining them under pressure of arriving bottles, it is not possible for the bottles to fall over.

Means for controlling the input of bottles to guide channel assemblies 63 to generally maintain a predetermined number of contiguous bottles in a column therein pressing upon bottles crowded into zone 74 have been provided whereby the pressure of the column of bottles of each channel assembly 63 will be sufficient to maintain the bottles in zone 74 in an upright position. Thus, a photoresponsive detector 79 is disposed at point 64 and serves to control an associated one of four clutch assemblies (not shown), each of which controls the drive for its associated elevator conveyor assembly 46.

Detector 79 is of conventional design of a type, for example, where a photocell 81 is disposed to receive a beam of light 82 from a lamp 83. The beam 82 is projected into the path of each bottle as it moves along guide channel assembly 63 so as to intercept beam 82 and provide an electrical signal indicating the presence of a bottle at that point.

Photocell 81 is coupled to a suitable time delay arrangement (not shown) whereby control of the clutch assembly for driving its associated elevator conveyor 46 will not be immediately effective. Thus, it will be appreciated that as a succession of bottles passes through beam 82, a number of signals will be developed which can be ignored unless they exceed the period of the time delay. However, should beam 82 become uninterrupted for a predetermined period so as to indicate empty or insufficient bottles in channel 63, detector 79 will serve to operate its associated drive clutch assembly for its associated elevator conveyor 46 and commence supplying a stream of bottles into guide channel assembly 63. Subsequently, when detector 79 detects that the column of contiguous bottles in guide channel 63 has built up to point 64 and beam 82 remains obstructed for a given length of time, the clutch assembly will be deenergized so as to arrest further delivery of bottles into the upper end of guide channel assembly 63 by elevator conveyor assembly 46.

In the foregoing manner, a predetermined column of contiguous bottles is assured whereby the weight of the column of bottles will apply a downward and forward pressure against the bottles 38 crowded into zone 74 and thereby preclude tumbling of the bottles in that zone.

From the foregoing, it will be readily evident that bottles dumped in a heap without regard to orientation are transformed into a plurality of streams of upright bottles to be fed at a high rate wherein each bottle is maintained under close control. Ultimately, the bottles are discharged in an upstanding position to be fed in a line for filling. Notwithstanding any tendency of the extremely light-weight bottles to fall over and be otherwise difficult to transport in such upstanding position, the bottles are maintained upright under a positive lateral pressure of crowded conditions whereby tumbling of the bottles is precluded.

I claim:

1. In a system for handling bottles of a type which are fillable from one end wherein the bottles are adapted to be positioned upright and carried in a line by a conveyor for filling, the combination comprising bin means adapted to receive randomly arranged bottles in a bulk accumulation thereof, means serving to withdraw bottles from said accumulation thereof and to feed the withdrawn bottles, on their sides, in a direction normal to their axes, to form a stream of bottles oriented to point in either of two opposite directions and moving in a direction normal thereto, means for removing from said stream all of those bottles oriented to point in a given one of said two directions, guide means for turning the remaining bottles of said stream to an upstanding disposition for discharge to said conveyor, and means serving to confine axial movement of the bottles throughout the length of said stream to a degree precluding end-for-end turning of the bottles.

2. In a system for handling bottles of a type which are fillable from one end wherein the bottles are adapted to be positioned upright and carried in a line for filling, the combination comprising conveyor means for receiving and conveying bottles upright for filling, guide means cooperating with said conveyor means to discharge bottles upright in a delivery zone onto said conveyor means in quantities in excess of the capability of the conveyor means to transport the bottles away to cause crowding among the discharge bottles, said crowding being reflected back to retard movement of bottles arriving via said guide means, means serving to supply bottles to said guide means, and means for controlling the input of bottles to said guide means to generally maintain a predetermined number of bottles in a column therein pressing upon bottles crowded into said zone, the pressure of said column being sufficient to maintain the bottles in said zone in an upright position.

3. In a system for handling bottles of a type which are fillable from one end, the combination including conveyor means serving to carry bottles, on their sides, in a direction normal to their axes to form a stream of bottles oriented to point in either of two opposite directions transverse to their direction of travel, and means serving to direct a jet of air adapted to impinge upon and remove from said conveyor, prior to discharge therefrom, those bottles pointing in a given one of said two directions to the exclusion of bottles pointing in the other of said two directions.

4. A system for handling bottles of a type which are smaller at one end than at the other, said system comprising bin means adapted to receive randomly arranged bottles in a bulk accumulation thereof, means serving to carry bottles from said accumulation in a path normal to their axes and to confine axial movement of bottles in the path to a degree precluding end-for-end turning of the bottles, hopper means disposed in said path to receive the bottles therein, said hopper means serving to confine axial movement of bottles received therein to a degree precluding end-for-end turning of the bottles, conveyor means including laterally extending lifting flites moving through the bottles received in said hopper means to carry bottles therefrom between adjacent flites, said bottles generally pointing in one of two opposite directions as they move in said path normal to their axes, means for removing from the conveyor, prior to discharge therefrom, all of those bottles pointing in one of said two directions whereby all bottles discharged from the conveyor are oriented to point in the other direction, means forming a guide channel to receive bottles discharged by said conveyor means and serving to definite the orientation of the axes of the bottles about the direction of bottle movement along said path, conveyor means for receiving bottles from said guide channel, the last said means including means forming a resistance zone in the path of said bottles serving to cause crowding thereof, said guide channel being disposed to discharge bottles in an upright position onto the last named conveyor means into said zone, and control means serving to maintain a supply line of contiguous bottles of sufficient extent in said guide channel to preclude tumbling of the bottles in said zone.

5. Apparatus according to claim 4 wherein said system further includes means serving to return all removed bottles to said bin means.

References Cited

UNITED STATES PATENTS 3,101,832   8/1963   Wyle et al. _____ 198—33

EVON C. BLUNK, *Primary Examiner.*

A. C. HODGSON, *Assistant Examiner.*